United States Patent [19]
Albion et al.

[11] Patent Number: 5,333,658
[45] Date of Patent: Aug. 2, 1994

[54] VENEER LATHE

[75] Inventors: Stephen R. Albion, Salem, Oreg.; Douglas C. Mackintosh, Vernon, Canada; James F. Uhl, Gresham, Oreg.

[73] Assignee: Premier Gear & Machine Works, Portland, Oreg.

[21] Appl. No.: 111,926

[22] Filed: Aug. 26, 1993

[51] Int. Cl.⁵ .......................... B27L 5/02; G06F 15/46
[52] U.S. Cl. ..................................... 144/213; 144/212; 144/365; 364/474.02; 364/474.09
[58] Field of Search ................... 144/209 R, 211, 212, 144/213, 356, 357, 365; 364/474.02, 474.09, 167.01

[56] References Cited

U.S. PATENT DOCUMENTS

| | | | |
|---|---|---|---|
| 4,506,714 | 3/1985 | Shrum et al. | 144/212 |
| 4,708,180 | 11/1987 | Browning, Jr. et al. | |
| 4,753,278 | 6/1988 | Lorenzo | 144/213 |
| 4,893,663 | 1/1990 | Ely | 144/213 |
| 4,922,979 | 5/1990 | Crabtree et al. | |
| 4,979,120 | 12/1990 | Ely | |
| 5,143,129 | 9/1992 | Toivio | 144/211 |

Primary Examiner—W. Donald Bray
Attorney, Agent, or Firm—Robert L. Harrington

[57] ABSTRACT

A veneer lathe for the peeling of a continuous strip of veneer off a log is arranged to automatically adjust the peeling blade angle and the position of the pressure roll as the log being peeled decreases in diameter. A control, such as a computer, is provided to control motors that adjust the angle of the blade and the position of the pressure roll according to the instant diameter of the log being peeled and in conjunction with other data input to the computer. A holder which supports the peeling blade is pivotally mounted on a movable carriage of the lathe. Pivoting the holder adjusts the angle of the blade. A carrier, which has a movable slide on which the pressure roll is mounted, is also pivotally mounted on the carriage. Pivoting the carrier will adjust the pressure roll vertically in relation to the peeling blade and movement of the carrier slide will adjust the pressure roll laterally in relation to the peeling blade. Position sensors are provided on the carriage, the blade holder, the carrier and the carrier slide to provide position feedback signals to the control.

7 Claims, 4 Drawing Sheets

VENEER LATHE

FIELD OF THE INVENTION

This invention relates to a carriage of a veneer lathe for supporting a peeling blade and pressure roll or bar used in conjunction to peel veneer off a log and more particularly it relates to mechanism for adjusting the blade and pressure roll during the peeling operation to accommodate the changing diameter of a log being peeled.

BACKGROUND OF THE INVENTION

Veneer is produced by peeling a thin continuous strip of material off a log. A log to be peeled is supported and rotated about its cylindrical axis by opposed spindles of the veneer lathe. A peeling blade supported on a carriage is fed into the periphery of the log cylinder at a rate to generate the desired thickness of the veneer. A pressure roll strategically positioned in relation to the cutting blade is provided to apply a compressive pressure to the periphery of the log in advance of the blade.

The quality of the veneer (and the plywood produced from the veneer) is dependent on the blade being progressively fed at a precise rate and at a precise angle to the log periphery so as to peel a consistent thickness of the veneer strip throughout the peeling process. It has been found that the angle of the blade is preferably varied as the log decreases in diameter for optimum results.

The pressure roll aids in obtaining the desired consistency of the veneer strip. The pressure roll applies a compressive force against the log in advance of the cutting blade. The compressive force applied tends to compress the wood fibers on the periphery and also provides a stabilizing effect on the log.

The blade and roll are carried by a movable carriage that is moved radially toward the spindle axis. The movement of the carriage is matched to the rotation of the spindles so that the blade is advanced into the log periphery at a rate to produce the desired thickness of veneer. A veneer thickness of 1/10 inch for example requires that the blade be fed into the log at a rate of 1/10 inch per revolution of the log.

The angle of the blade relative to the log periphery is important as is the consistency of the pressure applied by the pressure roll. However, as the log diameter gets smaller, the periphery of the log under and over the point of blade edge entry into the log curves more sharply away from the blade edge and to maintain the desired consistency, the blade angle and the position of the pressure roll need to be adjusted.

Providing adjustment for the blade edge angle and positioning of the pressure roll (sometimes a pressure bar and is encompassed by the term pressure roll herein) is not new as evidenced by U.S. Pat. No. 4,708,180. However, the adjustment heretofore provided, e.g, in the '180 patent, is complex, it is not precise, and it introduces substantial complexity. There is a need to provide such adjustment with less complexity and greater accuracy which is an objective of the present invention.

BRIEF SUMMARY OF THE INVENTION

The present invention is a veneer lathe that has computer controlled adjustment for the angle of the peeling blade. The blade is mounted in a holder that is in turn rotatively mounted on a carriage of the veneer lathe. A hydraulic motor is directly attached to the holder and generates controlled angular displacement of the holder on the carriage. A computer is programmed to adjust the angular position of the blade as the blade is advanced toward the spindle axis. The computer can be programmed as desired by the operator to adapt the blade angle to suit the desired result, e.g, as may be required for different types of wood.

A pressure roll, used in conjunction with the peeling blade, is mounted on a sub-assembly or carrier that is adjustably mounted on the carriage. The pressure roll may be advanced and retracted relative to the peeling blade in a direction substantially parallel to the plane of travel that the blade traverses as the carriage is fed toward the spindles (i.e., in a horizontal direction). A single hydraulic motor adjusts the advancement of the roll to position the pressure roll at the proper distance from the peeling blade for peeling a desired thickness of veneer and accomplishes the function of retraction of the pressure roll during the initial stage of rounding up the log. The positioning of the pressure roll is controlled by computer to adjust the roll to the log curvature and can be adjusted as desired by the operator.

The pressure roll is provided with vertical adjustment as well. Simply advancing the roll forward relative to the blade is not sufficient for as the log diameter decreases during the peeling process, the geometry as between the log, the peeling blade and pressure roll is constantly changing. Another hydraulic motor is provided on the sub-carriage to raise and lower the pressure roll relative to the blade as the roll is advanced relative to the blade edge. This adjustment results in maintaining the spacing between the blade and the roll. Again, this movement of raising and lowering the pressure roll is controlled by the computer and can be adjusted by the operator.

These improvements will be more clearly understood by reference to the following detailed description and drawings referred to therein.

DESCRIPTION OF THE PREFERRED EMBODIMENT

Figure 1:
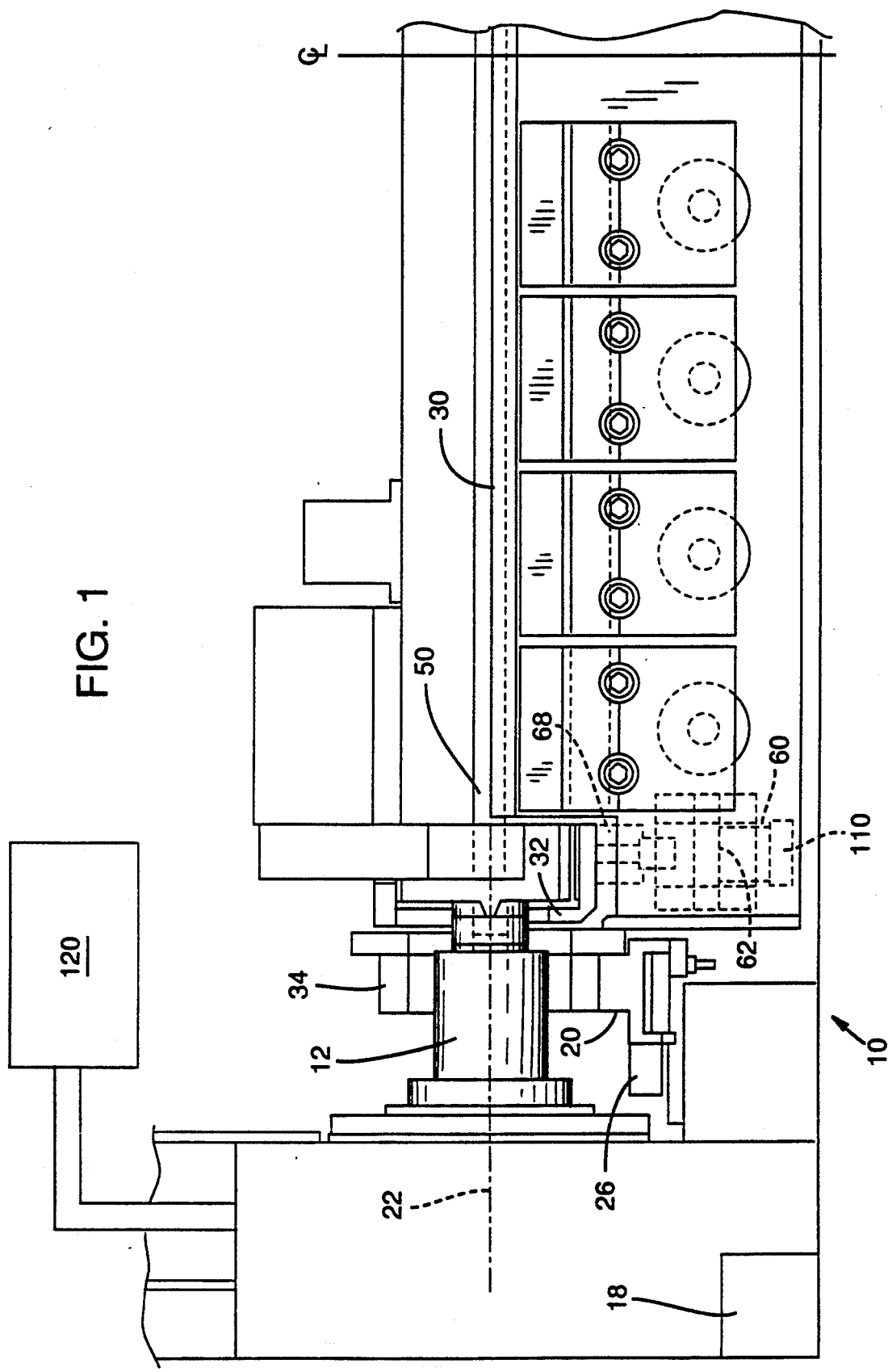
FIG. 1 is a diagrammatical view of a veneer lathe of the present invention.

Logs are peeled in veneer lathes to produce a continuous thin strip of veneer. A general explanation of the process is provided having reference to FIG. 2. A log 14 to be peeled is supported at its ends and is rotatably driven by opposed spindles 12. A peeling blade 30, mounted on a carriage 20 of the lathe, is fed into the rotating log 14 at a prescribed feed rate to peel a continuous strip of veneer off the log. A pressure roll 50, also mounted on the carriage 20, applies a force against the log periphery in advance of the peeling blade. The quality and consistency of the veneer is best maintained by adjusting the angle of blade 30 and the position of the pressure roll 50 as the log diameter decreases during the peeling process. The carriage 20 of the veneer lathe is arranged to support and feed the peeling blade and pressure roll toward and away from the rotational axis 22 of the spindles 12 of the lathe.

Refer now to FIG. 1 of the drawings which diagrammatically illustrates a veneer lathe 10. For simplicity, only one spindle end of the veneer lathe is illustrated. The veneer lathe has opposed spindles 12 for supporting and rotating a log to be peeled into a continuous veneer strip. The spindles 12 are arranged to grip the ends of a log to be peeled and the spindles are rotatably driven in a conventional manner by a motor 18. A carriage 20 is movably mounted on the lathe 10 with the carriage being movable toward and away from the rotational axis 22 of the spindles 12. The carriage is supported on suitable guide ways and is moved by conventional feed mechanism such as feed screws. A control apparatus, such as a programmable computer 120, is provided to control the operation of the veneer lathe 10 including its motors in a known manner. A sensor 26 provided on the carriage 20 and connected to the computer 120 provides positional information of the carriage 20 in relation to the rotational axis 22 of the spindles 12 of the lathe 10.

A peeling blade 30 and a pressure roll 50 are mounted on the carriage 20 and as the carriage is fed toward the rotational axis 22 of the spindles 12, the blade 30 will peel a strip of veneer off the log. The feed rate of the carriage 20 is coupled to the rotational rate of the spindles 12 to produce veneer of a desired thickness. The pressure roll 50 is positioned so that it will apply a compressive force against the log periphery in advance of the peeling blade 30. The quality and consistency of the veneer being peeled from the log is best maintained by adjusting both the angle of the peeling blade and the position of the pressure roll as the log diameter decreases during the peeling process. The veneer lathe of the present invention is arranged to adjust the angle of the peeling blade and the position of the pressure roll automatically as the log diameter decreases.

Figure 2:
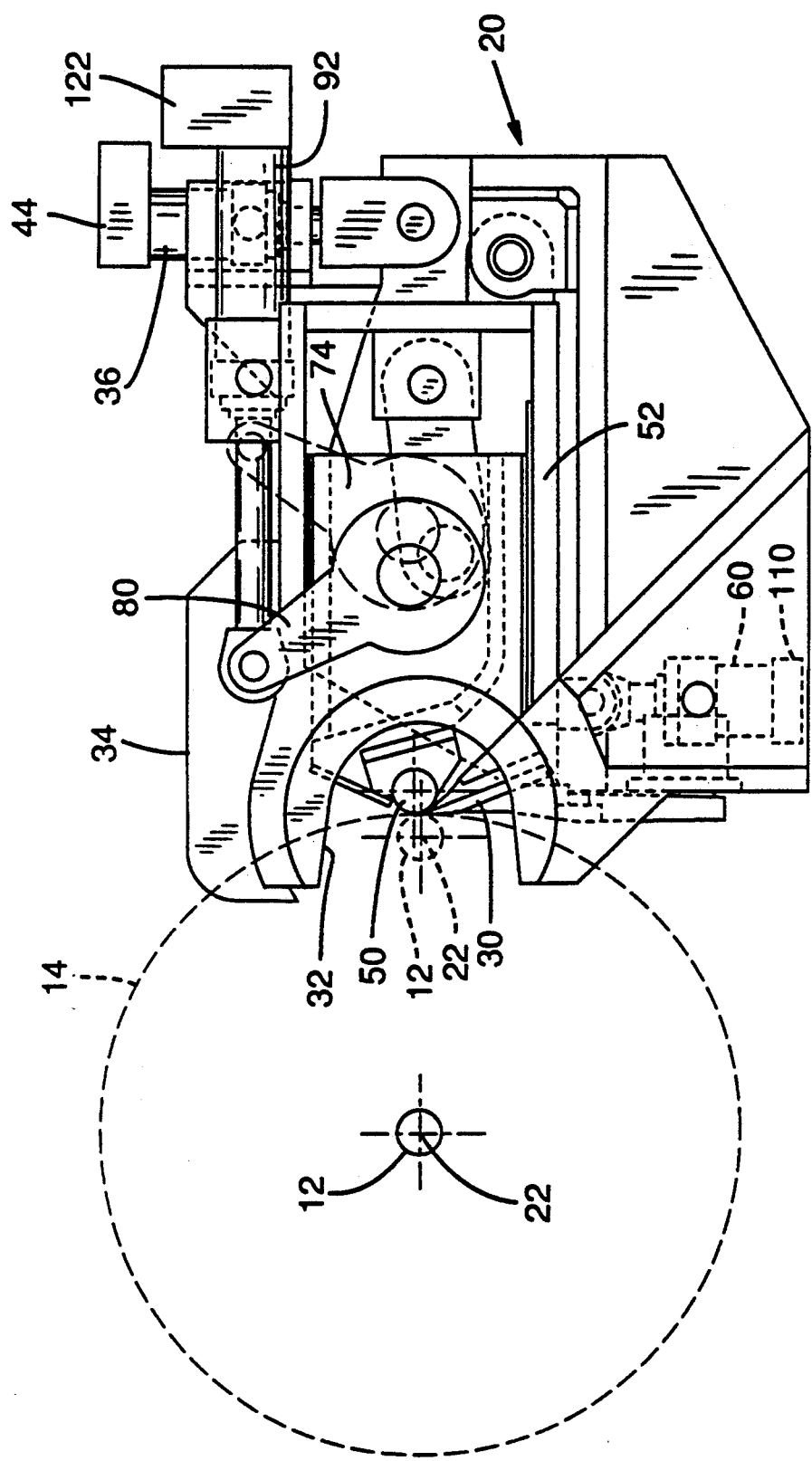
FIG. 2 is a view of a portion of a carriage of the veneer lathe of FIG. 1.

As seen in FIG. 2 which illustrates a portion of the carriage 20 of the veneer lathe 10, the carriage 20 has structure which adjustably supports the peeling blade 30 and the pressure roll 50. A holder 32, which receives the blade 30, is pivotally mounted to end frames 34 of the carriage 20 and a carrier 52 for supporting the pressure roll is pivotally mounted on the carriage 20. The carrier 52 has a movable slide 74 on which the pressure roll 50 is mounted. The pivotal mounting of the holder 32 provides the capability of adjusting the angle of the blade 30. The pivotal mounting of the carrier 52 and the movable slide 74 on the carrier 52 provides for lateral and vertical adjustment of the pressure roll 50.

Figure 3:
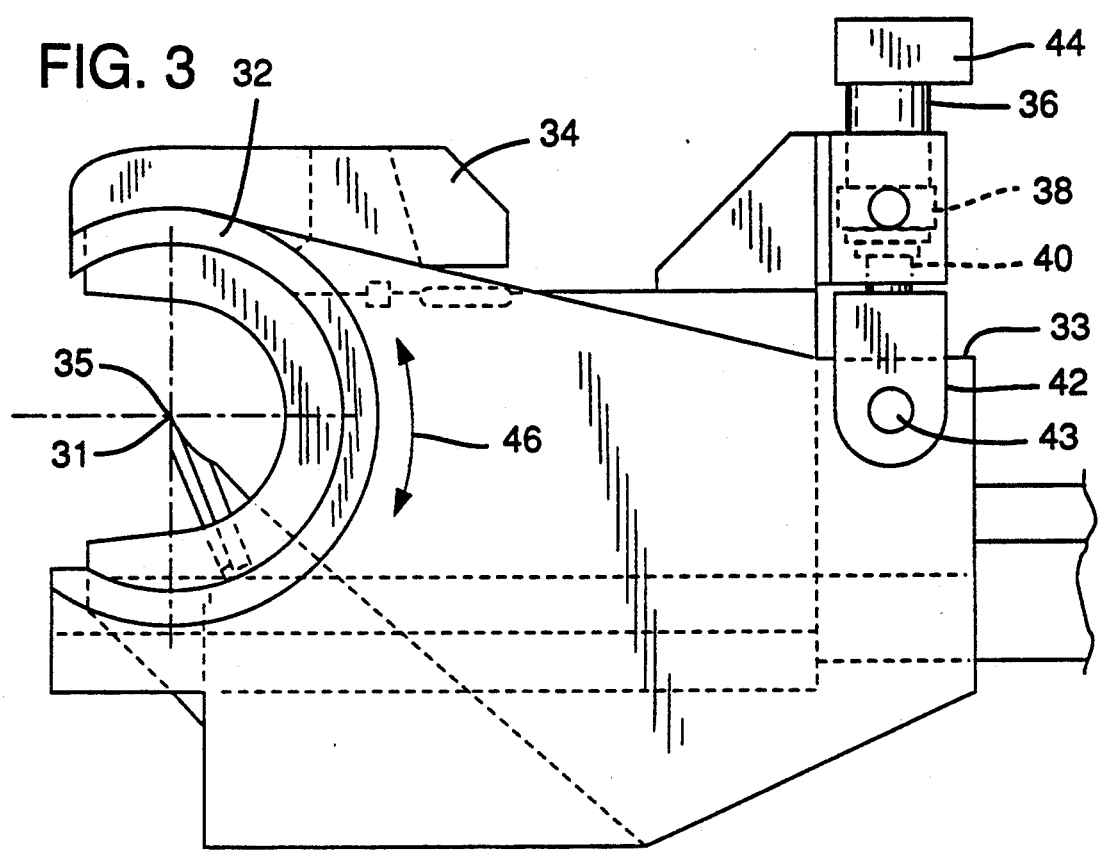
FIG. 3 is a view showing the mounting arrangement of a blade holder and peeling blade on the carriage of FIG. 2.

Refer now to FIG. 3 which further illustrates the arrangement of the holder 32 on the carriage 20. The holder 32 is pivotally mounted to the end frames 34 of the carriage 20. The holder 32 has an axis of pivot 35 and is pivotally movable as indicated by arrow 46. The holder 32 is pivotally moved by a cylinder (motor) 36 controlled by the computer 120. The cylinder 36 is pivotally mounted on a bracket 38 of the carriage 20 and has an end 42 of its cylinder rod 40 pivotally connected to a frame 33 of the holder 32 by a shaft 43. Extension and retraction of the rod 40 will thus pivot the holder 32 about axis 35 on the carriage 20 as indicated by the arrow 46. The blade 30 is mounted on the holder 32 with the tip 31 of the blade preferably at the pivotal axis 35 of the holder 32. As the holder 32 is pivoted, the blade 30 will be pivoted about its tip 31.

Figure 4:
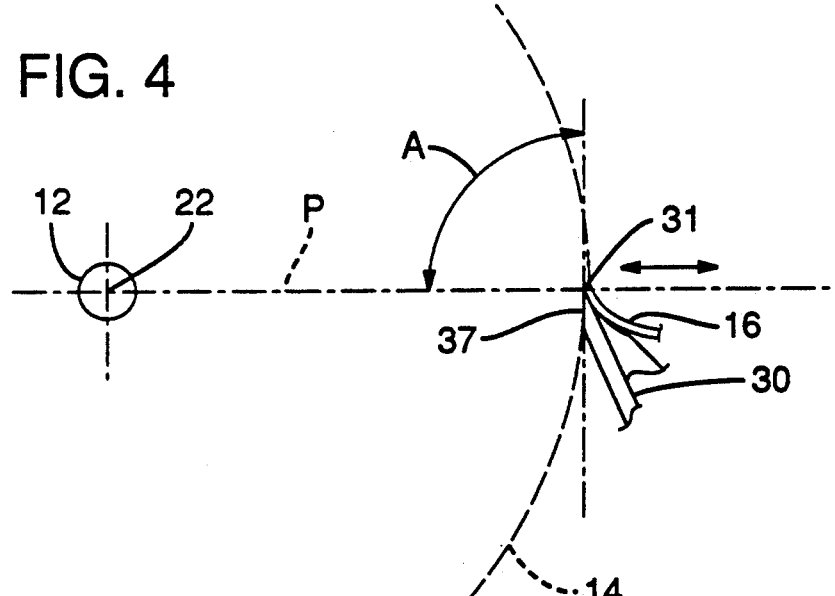
FIG. 4 is a view showing the angular positioning of the peeling blade of the veneer lathe of FIG. 1.

The angular adjustment of the blade 30 is diagrammatically illustrated in FIG. 4. The cutting tip 31 of the blade 30 travels on a path substantially parallel to a plane P as the carriage 20 is moved toward and away from the rotational axis 22 of the spindles 12 of the lathe 10 as indicated by arrow 39. For purposes of this embodiment, the travel path of the tip 31 will be considered parallel to plane P even when the travel path of the tip 31 is coincident with the plane P. The plane P extends from the rotational axis 22 of the spindles 12 and in this embodiment, the plane P is basically horizontal. The angle of reference for the blade 30, indicated by the letter A, is the angle between the leading edge 37 of the blade 30 and the plane P. In this embodiment, the angle A of the blade 30 is adjustable between about 91 degrees and 86 degrees. The angle A of the blade 30 is adjusted by pivoting the holder 32 about its pivotal axis 35 by the extension and retraction of the rod 40 of the cylinder 36. As previously mentioned, the blade 30 is mounted in the holder 32 such that the tip 31 of the blade 30 is at the pivotal axis 35 of the holder 32. As the holder 32 is pivoted about axis 35, the blade 30 will be pivoted about its tip 31.

Referring again to FIG. 3, a position sensor 44 is coupled to the cylinder 36 to provide positional information on the position of the cylinder rod 40 and thus the angle A at which the blade 30 is adjusted. The position sensor 44 is connected to the computer 120 to provide feedback data to the computer.

Figure 5:
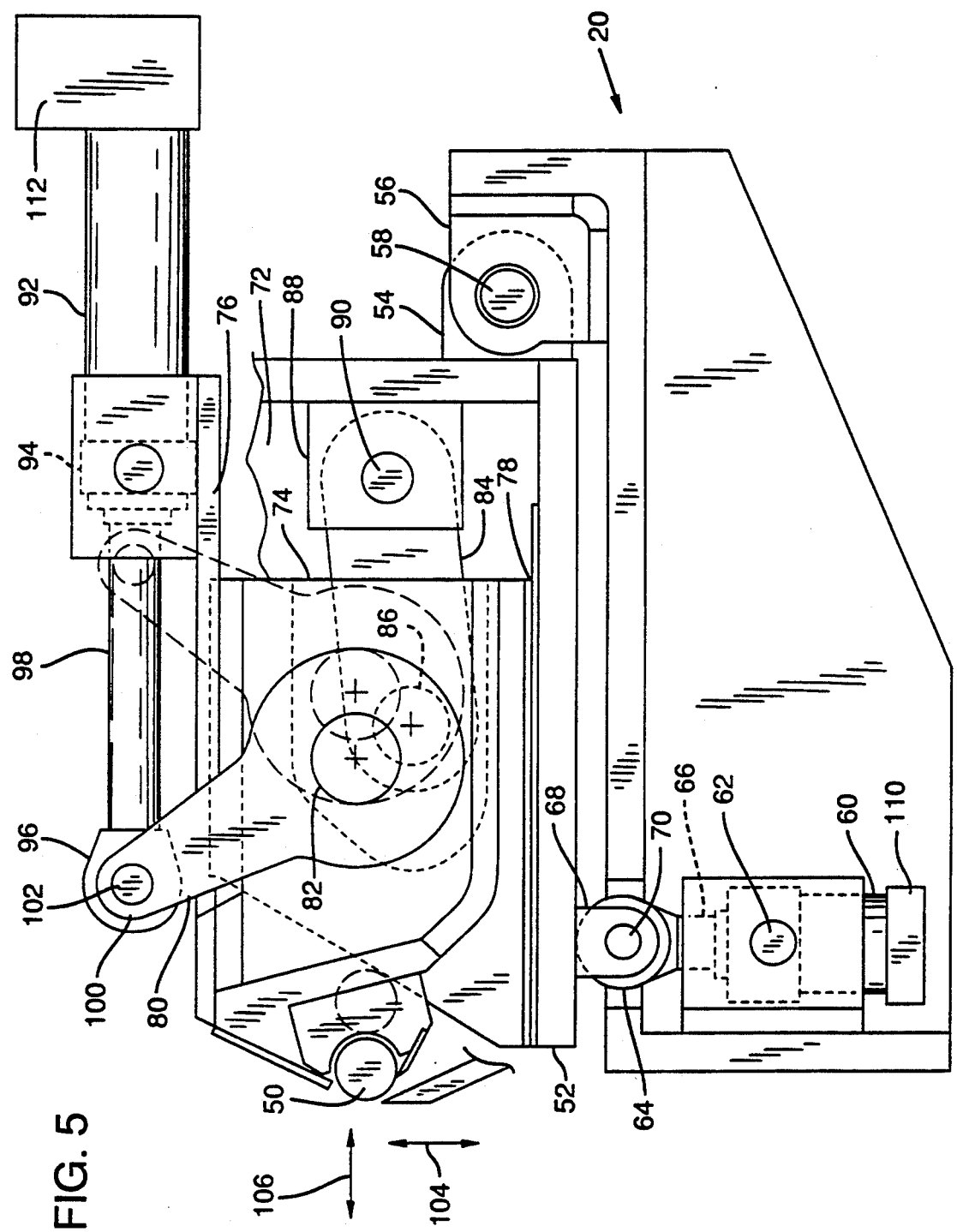
FIG. 5 is a view of the mounting arrangement of a carrier on the carriage of the veneer lathe of FIG. 1.

FIG. 5 illustrates the mounting arrangement of the carrier 52 on the carriage 20. An end 54 of the carrier 52 is pivotally mounted to a frame 56 of the carriage 20 on shaft 58. The shaft 58 defines the axis of pivot of the carrier 52 on the carriage 20. The carrier 52 is pivoted on the carriage 20 by a cylinder (motor) 60 controlled by the computer 120. The cylinder 60 is pivotally mounted to the carriage 20 on a bracket 62 and has an end 64 of its rod 66 pivotally connected to a bracket 68 of the carrier 52 by a shaft 70. The carrier 52 is pivotally moved about its axis of pivot (shaft 58) by extension and retraction of the cylinder rod 66 of the cylinder 60. The carrier 52 has upstanding walls 72 on which a movable slide 74 is mounted in guide ways 76, 78. A pivot arm 80 is pivotally mounted to the slide 74 on a shaft 82. One end of a connecting link 84 is pivotally connected to the pivot arm 80 on shaft 86 and the opposite end of the link 84 is pivotally connected to a bracket 88 extending from the carrier 52 on a shaft 90. A cylinder (motor) 92 pivotally mounted to the carrier 52 on bracket 94 is provided for pivotally moving the pivot arm 80. The cylinder 92 is controlled by the computer 120. An end 96 of a cylinder rod 98 of the cylinder 92 is pivotally mounted to an end 100 of the pivot arm 80 on shaft 102. The slide 74 is arranged to support the pressure roll 50 in a conventional manner such as on bearings. Extension and retraction of the cylinder rod 98 will pivot the pivot arm 80 about shaft 82 which will force movement of the slide 74 on the carrier 52 to thus move the pressure roll 50.

The pressure roll 50 is thus vertically movable in reference to plane P by extension and retraction of cylinder rod 66 of cylinder 60 as indicated by arrow 104 and is movable laterally as indicated by arrow 106 substantially parallel to plane P by extension and retraction of cylinder rod 98 of cylinder 92. A position sensor 110 is coupled to the cylinder 60 to provide vertical positioning information for the pressure roll 50. A sensor 112 is coupled to the cylinder 92 to provide lateral positioning information of the pressure roll 50. The sensors 110 and 112 are connected to the computer 120 to provide feedback data to the computer.

Figure 6:
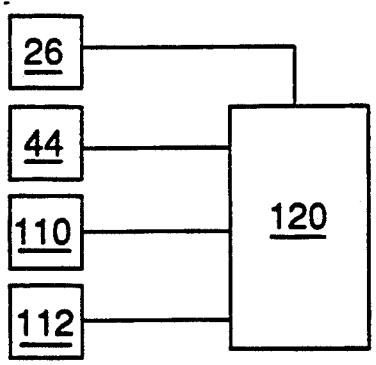
FIG. 6 is a view of the sensors of the veneer lathe of FIG. 1 coupled to a computer.

The position sensor 26 provided on the carriage 20, (FIG. 1) the position sensor 44 provided on the blade adjusting cylinder 36, (FIG. 3) the position sensor 110 provided on the carrier vertical adjusting cylinder 60 (FIG. 5) and the position sensor 112 provided on the carrier slide lateral adjusting cylinder 92 (FIG. 5), are all coupled (connected) to the computer 120 as illustrated in FIG. 6.

The carriage position sensor 26 senses the position of the carriage and provides feed back information to the computer 120 as to the position of the carriage relative to the rotational axis 22 of the spindles 12. The known position of the carriage 20 provides the known position of the tip 31 of the blade 30 since the tip 31 of the blade 30 is mounted at a known position on the carriage 20. The known position of the tip 31 of the blade 30 establishes the instant diameter of the log 14 being peeled in the veneer lathe 10. The angle of the blade 30 will be automatically adjusted to the desired angle by the computer 120 according to the position of the tip 31 relative to the rotational axis 22 of the spindles 12 and in effect according to the instant diameter of the log 14 being peeled. The sensor 44 senses the angle of the blade 30 and provides feedback information to the computer 120. It will be appreciated that other data input to the computer 120 is utilized in conjunction with the position of the tip 31 of the blade 30. The data may include, but is not limited to, the tree species, the thickness of the veneer being peeled, the blade configuration and so forth.

The position of the pressure roll 50 is also automatically adjusted relative to the blade 30 by the computer 120 during the process of peeling a log in the veneer lathe 10. Sensor 110 senses the vertical position of the pressure roll 50 and sensor 112 senses the lateral position of the pressure roll 50 both of which provide feedback information to the computer 120 as to the position of the pressure roll in relation to the blade 30. The pressure roll 50 is initially fully retracted to enable the initial rounding up of the log to be peeled by the blade 30. The pressure roll 50 is then adjusted vertically and laterally relative to the blade 30 according to the thickness of the veneer to be peeled, the adjusted angle of the blade 30 and the instant diameter of the log being peeled (i.e., the position of the tip 31 of the blade 30 relative to the rotational axis 22 of the spindles 12).

The angle of the blade 30 and the position of the pressure roll 50 may thus be adjusted automatically during the peeling process to accommodate all peeling conditions including the initial rounding up of the log and continuing until the log has been peeled to its minimum diameter.

Those skilled in the art will recognize that modifications and variations may be made without departing from the true spirit and scope of the invention. The invention is therefore not to be limited to the embodiments described and illustrated but is to be determined from the appended claims.

What is claimed is:

1. A veneer lathe having opposed spindles with a common rotational axis, a carriage movably mounted on the lathe for supporting and feeding a peeling blade and a pressure roll toward the rotational axis for peeling a continuous strip of veneer off a log supported and rotated in the opposed spindles and a control for controlling the operation of the lathe, and the improvement comprising:
   a holder pivotally mounted on the carriage;
   a blade mounted on the holder;
   a motor mounted on the carriage and directly connected to the holder for pivoting the holder on the carriage; and
   a programmable computer connected to the motor and programmed to adjust the angle of the holder according to a prescribed program.

2. A veneer lathe as defined in claim 1, further including:
   a carrier pivotally mounted on the carriage;
   a slide movably mounted on the carrier;
   a pressure roll mounted on the slide;
   a second motor mounted on the carriage and connected to the carrier for pivoting the carrier on the carriage to adjust the vertical position of the pressure roll; and
   a third motor mounted on the carrier and connected to the slide for moving the slide on the carrier to adjust the lateral position of the pressure roll.

3. A veneer lathe as defined in claim 1, further including:
   a first sensor coupled to the carriage and connected to the control for sensing the position of the carriage; and
   a second sensor coupled to the holder and connected to the control for sensing the angle of the blade.

4. A veneer lathe as defined in claim 2, further including:
   a first sensor coupled to the carriage and connected to the control for sensing the position of the carriage;
   a second sensor coupled to the holder and connected to the control for sensing the angle of the blade;
   a third sensor coupled to the carrier and connected to the control for sensing the position of the carrier; and
   a fourth sensor coupled to the slide and connected to the control for sensing the position of the slide.

5. A veneer lathe having opposed spindles with a common rotational axis, a carriage movably mounted on the lathe for supporting and feeding a peeling blade and a pressure roll toward the rotational axis for peeling a continuous strip of veneer off a log supported and rotated in the opposed spindles and a control for controlling the operation of the lathe, and the improvement comprising:
   a holder pivotally mounted on the carriage;
   a blade mounted on the holder;
   a motor mounted on the carriage and directly connected to the holder for pivoting the holder on the carriage;
   a programmable computer connected to the motor and programmed to adjust the angle of the holder according to a prescribed program;
   a carrier pivotally mounted on the carriage;
   a slide movably mounted on the carrier;
   a pressure roll mounted on the slide;
   a second motor mounted on the carriage and connected to the carrier for pivoting the carrier on the carriage to adjust the vertical position of the pressure roll; and a third motor mounted on the carrier and connected to the slide for moving the slide on the carrier to adjust the lateral position of the pressure roll.

6. A veneer lathe having opposed spindles with a common rotational axis, a carriage movably mounted on the lathe for supporting and feeding a peeling blade and a pressure roll toward the rotational axis for peeling a continuous strip of veneer off a log supported and rotated in the opposed spindles and a control for controlling the operation of the lathe, and the improvement comprising:

a holder pivotally mounted on the carriage;
a blade mounted on the holder;
a motor mounted on the carrier and directly connected to the holder for pivoting the holder on the carriage;
a programmable computer connected to the motor and programmed to adjust the angle of the holder according to a prescribed program;
a carrier pivotally mounted on the carriage;
a slide movably mounted on the carrier;
a pressure roll mounted on the slide;
a second motor mounted on the carrier and connected to the slide for moving the slide on the carrier to adjust the lateral position of the pressure roll; and
said second motor including a piston and cylinder and connected to the slide through a pivot arm, one end of said pivot arm pivotally connected to said second motor, the other end of said pivot arm pivotally connected to the carrier, and said pivot arm intermediate said ends pivotally connected to said slide whereby pivoting of the one end of the arm by said motor produces substantially lateral movement of the slide and the pressure roller carried by the slide.

7. A veneer lathe as defined by Claim 6 wherein a programmable control controls the movement of the second motor, a program provided for the computer having a first setting of the second motor to fully withdraw the pressure roll during roundup of a log, and a second setting for the pressure roll whereby the pressure roll is moved relative to the blade in response to the detected diameter of a log being peeled.

* * * * *